United States Patent
Sato et al.

(10) Patent No.: US 6,180,209 B1
(45) Date of Patent: Jan. 30, 2001

(54) BIAXIALLY ORIENTED POLYESTER FILM

(75) Inventors: Yoshinori Sato, Tokyo; Yoshio Meguro, Shiga-ken, both of (JP)

(73) Assignee: Mitsubishi Polyester Film Corporation, Tokyo (JP)

( * ) Notice: Under 35 U.S.C. 154(b), the term of this patent shall be extended for 0 days.

(21) Appl. No.: 09/408,431

(22) Filed: Sep. 29, 1999

(30) Foreign Application Priority Data

Oct. 2, 1998 (JP) .................................................. 10-281092

(51) Int. Cl.⁷ ........................... B32B 27/08; B32B 27/18; B32B 27/20; B32B 27/36

(52) U.S. Cl. ........................... 428/141; 428/213; 428/323; 428/327; 428/328; 428/330; 428/337; 428/339; 428/480; 428/694 ST; 428/694 SG; 428/910

(58) Field of Search ...................................... 428/141, 213, 428/323, 327, 328, 329, 330, 331, 337, 339, 490, 694 ST, 694 SG, 910; 524/436

(56) References Cited

U.S. PATENT DOCUMENTS

| 5,006,589 | * | 4/1991 | Sakamoto et al. | 524/430 |
| 5,270,096 | * | 12/1993 | Kato et al. | 428/143 |
| 5,372,879 | * | 12/1994 | Handa et al. | 428/327 |

FOREIGN PATENT DOCUMENTS

| 0 502 745 A2 | 9/1992 | (EP) . |
| 0 567 974 A1 | 11/1993 | (EP) . |
| 0 572 224 A1 | 12/1993 | (EP) . |
| 0 609 060 A1 | 8/1994 | (EP) . |
| 9-048181 | * 2/1997 | (JP) . |
| WO 97/32724 | 9/1997 | (WO) . |

* cited by examiner

*Primary Examiner*—Vivian Chen
(74) *Attorney, Agent, or Firm*—Dike, Bronstein, Roberts & Cushman, LLP; David G. Conlin

(57) ABSTRACT

The present invention relates to a biaxially oriented polyester film containing 0.01 to 3.0% by weight of inorganic particles X and 0.001 to 1.5% by weight of crosslinked polymer particles Y, the particles diameters of said particles X and Y satisfying the following relationships (1) to (3) at the same time:

$$0.1 \leq dX50 \leq 1.5 \quad (1)$$

$$dX50 < dY50 \leq dX10 \quad (2)$$

$$1.0 \leq dY25/dY75 \leq 1.5 \quad (3)$$

wherein dX50 represents the average diameter ($\mu$m) of the inorganic particles X; dX10 represents the particle diameter at the point of 10% of the total volume when the volume has been integrated from the large particle diameter in the particle size distribution of the inorganic particles X; dY50 represents the average diameter ($\mu$m) of the crosslinked polymer particles Y; and dY25 and dY75 represent the particle diameters ($\mu$m) at the points of 25% and 75%, respectively, of the total volume when the volume has been integrated from the large particle side in the particle size distribution of the crosslinked polymer particles Y.

10 Claims, No Drawings

BIAXIALLY ORIENTED POLYESTER FILM

BACKGROUND OF THE INVENTION

The present invention relates to a biaxially oriented polyester film. More particularly, it relates to a biaxially oriented polyester film which, when used as a base film for high-quality magnetic recording media, can highly satisfy the running property and electromagnetic transducing performance required of the magnetic recording media, and is also excellent in chipping resistance, prevention of dropout, handling property and winding property in the film-forming and magnetic recording medium production processes.

Biaxially oriented polyester films are widely used as an industrial material because they have various advantageous properties in a well-balanced manner and high cost performance.

Recently, in use of polyester films for magnetic tapes in particular, it is noted that the property requirement for the base film is becoming more and more strict for realizing higher quality of magnetic tapes. Specifically, in order to improve electromagnetic transducing performance, it is strongly desired that the film surface be flat, and particularly it is an essential condition that there exist in the film surface no coarse projections which might become a cause of dropout. On the other hand, it is also necessary to roughen the film surface to a pertinent degree to reduce the friction coefficient of the film so as to enhance the running property of the magnetic recording medium.

On the other hand, in the film working steps, for example in the steps of magnetic layer coating, calendering and take-up of the film in the manufacture of magnetic recording media, the problem exists that the film surface could be chipped off through contact with the rolls or guides, and the resulting flaw deteriorates the electromagnetic transducing performance or the chipping dust causes dropout.

Also, with prevalence of video software in recent years, high-speed dubbing devices have come to be used for enhancing soft video tape productivity, and in use of such high-speed dubbing devices, high quality of the magnetic tape, and of the base film for such magnetic tape, has become an essential requirement. Since the magnetic tape running speed at dubbing is faster than the tape run in normal video replay, there is required a design different from that required for improvement of running property of the conventional magnetic tapes. For example, it is required that the magnetic tape has high running stability and won't move zigzag in high-speed run, and that the tape remains safe from being chipped off during running so that there will be no risk of dropout being caused by chipping dust. That is, the magnetic tape is required to have high-degree chipping resistance. Further, in addition to such chipping resistance in high-speed run, it is also required for the magnetic tape to show high durability, namely extraordinarily high degree of wear resistance, in repeated use of the magnetic recording medium.

Beside these strict quality requirements, request for cost reduction is also intense, and it is essential that the base film productivity is high.

As a result of the present inventors' earnest studies to solve the above problems, it has been found that by containing the inorganic particles having a specific average diameter as well as the crosslinked polymer particles having a specific average diameter in a biaxially oriented polyester film, the above problems can be solved.

The present invention has been attained on the basis of the above finding.

SUMMARY OF THE INVENTION

The object of the present invention is to provide a biaxially oriented polyester film which, when for instance used as a base film for magnetic recording media, can highly satisfy the winding property, running property and electromagnetic transducing performance required of a magnetic recording medium, and is excellent in slitting performance in production of films and magnetic recording media, preventive of occurrence of dropout, minimized in the risk of suffering scratches and generating abrasion dust, high in productivity and low in production cost.

To attain the above object, in the first aspect of the present invention, there is provided a biaxially oriented polyester film containing 0.01 to 3.0% by weight of inorganic particles X and 0.001 to 1.5% by weight of crosslinked polymer particles Y, the particles diameters of said particles X and Y satisfying the following relationships (1) to (3) at the same time:

$$0.1 \leq dX50 \leq 1.5 \quad (1)$$

$$dX50 < dY50 \leq dX10 \quad (2)$$

$$1.0 dY25/dY75 \leq 1.5 \quad (3)$$

wherein dX50 represents the average diameter ($\mu$m) of the inorganic particles X; dX10 represents the particle diameter at the point of 10% of the total volume when the volume has been integrated from the large particle diameter in the particle size distribution of the inorganic particles X; dY50 represents the average diameter ($\mu$m) of the crosslinked polymer particles Y; and dY25 and dY75 represent the particle diameters ($\mu$m) at the points of 25% and 75%, respectively, of the total volume when the volume has been integrated from the large particle side in the particle size distribution of the crosslinked polymer particles Y.

In the second aspect of the present invention, there is provided a biaxially oriented laminated polyester film comprising:

a layer B comprising a polyester and at least one layer A comprising a polyester and containing 0.01 to 3.0% by weight of inorganic particles X and 0.001 to 1.5% by weight of crosslinked polymer particles Y, the particles diameters of said particles X and Y satisfying the following relationships (1) to (3) at the same time:

$$0.1 \leq dX50 \leq 1.5 \quad (1)$$

$$dX50 < dY50 \leq dX10 \quad (2)$$

$$1.0 dY25/dY75 \leq 1.5 \quad (3)$$

wherein dX50 represents the average diameter ($\mu$m) of the inorganic particles X; dX10 represents the particle diameter at the point of 10% of the total volume when the volume was integrated from the large particle diameter in the particle size distribution of the inorganic particles X; dY50 represents the average diameter ($\mu$m) of the crosslinked polymer particles Y; and dY25 and dY75 represent the particle diameters ($\mu$m) at the points of 25% and 75%, respectively, of the total volume when the volume was integrated from the large particle side in the particle size distribution of the crosslinked polymer particles Y.

In the third aspect of the present invention, there is provided a biaxially oriented laminated polyester film comprising:

a layer B comprising a polyester, a layer A comprising a polyester and laminated on one side of the layer B and a layer C comprising the same polyester composition as the layer A and laminated on the opposite side of the layer B, the layer C thickness tc being 0.1 to 0.7 times the layer A thickness, and the difference in root mean square roughness between the layer A surface and the layer C surface, as determined by a noncontact type surface roughness tester, being within the range of 2 to 15 nm.

DETAILED DESCRIPTION OF THE INVENTION

The present invention is explained in detail below.

The polyester constituting the film of the present invention is a polyester obtained by using an aromatic dicarboxylic acid or an ester thereof and a glycol as starting materials, in which not less than 80% of the repeating structural units comprise ethylene terephthalate units or ethylene-2,6-naphthalate units. A third material may be contained as far as the above condition is maintained.

The aromatic dicarboxylic acids usable as starting material include, for example, terephthalic acid, 2,6-naphthalenedicarboxylic acid, isophthalic acid, phthalic acid, adipic acid, sebacic acid, 4,4'-diphenyldicarboxylic acid and oxycarboxylic acids (such as p-oxyethoxybenzoic acid). The glycols usable as another starting material include, for example, ethylene glycol, diethylene glycol, triethylene glycol, propylene glycol, butanediol, 1,4-cyclohexanedimethanol and neopentyl glycol. These glycols may be used either singly or as a mixture of two or more of them.

The "laminated film" referred to in the present invention is, for instance, a film of a laminated structure in which all of the laminations are formed by extruding the materials by the so-called co-extrusion method, i.e. melt co-extruding the materials from the die head of an extruder, and stretching and heat treating the extrudate. The laminated structure may be two, three or more layers structure. For instance, when the layer containing the specific inorganic particles X and specific crosslinked polymer particles Y is called layer A and the base layer comprising a polyester is called layer B, in case where the layer A is laminated on both sides of the layer B, the layer B may be constructed as a two-layer or three-layer structure so that the film as a whole will have a four-layer or five-layer laminated structure.

The film according to the present invention contains the inorganic particles X and crosslinked polymer particles Y, both of which have a specific range of particle diameter and a specific particle size distribution. Examples of the inorganic particles usable in the present invention include the particles of calcium carbonate, calcium phosphate, silica, kaolin, talc, titanium dioxide, alumina, barium sulfate, calcium fluoride, lithium fluoride, zeolite, molybdenum sulfide and the like. When making a film of a laminated structure, such particles are contained in the layer forming at least one side of the film, i.e. layer A.

Among the said inorganic materials, calcium carbonate is most preferred as it can satisfy the requirements for high-degree chipping resistance and running property of the film. The calcium carbonate particles have relatively good affinity for the polyesters and won't easily come off the film, so that they contribute to enhancing chipping resistance of the film. They also allow efficient formation of the film surface projections which are effective for improving the running property of the film.

In the case of a film of a single-layer structure, the content of the inorganic particles X, is in the range of 0.01 to 3.0% by weight, preferably 0.01 to 1.0% by weight, more preferably 0.05 to 0.8% by weight. In the case of a film of a laminated structure, the said content is usually in the range of 0.01 to 3.0% by weight, preferably 0.05 to 1.0% by weight, more preferably 0.1 to 0.7% by weight, based on the polyester layer A forming the outer layers. The average particle diameter $dX50$ of the inorganic particles X is in the range of 0.01 to 1.5 $\mu$m by weight, preferably 0.3 to 1.0 $\mu$m. When the content of the inorganic particles X is less than 0.01% by weight or their average particle diameter is less than 0.1 $\mu$m, their effect of improving the running property or handling properties of the film may be unsatisfactory. On the other hand, when their content or average particle diameter exceeds the above-defined range, there may result a reduction of electromagnetic transducing performance in use of the film for magnetic recording media, an increase of dropouts, and deterioration of chipping resistance.

The film of the present invention contains the crosslinked polymer particles Y in addition to the said inorganic particles X. In the case of a film of a single-layer structure, the content of the crosslinked polymer particles, is in the range of 0.001 to 1.5% by weight, preferably 0.001 to 1.0% by weight, more preferably 0.01 to 0.7% by weight, especially preferably 0.05 to 0.5% by weight. In the case of a film of a laminated structure, the said content is in the range of 0.01 to 1.5% by weight, preferably 0.05 to 1.0% by weight, more preferably 0.1 to 0.7% by weight, based on the polyester layer A forming the outer layers.

In the present invention, it is essential that the average diameter $dY50$ of the crosslinked polymer particles Y satisfies the relationship of $dX50 < dY50 \leq dx10$ in relation to the particle size distribution parameters $dX50$ and $X10$ of the inorganic particles X. It is also essential that the particle size distribution parameter $dY25/dY75$ of the crosslinked polymer particles Y falls within the range of 1.0 to 1.5, preferably 1.0 to 1.3, more preferably 1.0 to 1.2.

As described above, in the film of the present invention, there are contained both of the inorganic particles X and the crosslinked polymer particles Y, the former being contained for the purpose of improving the running and handling qualities of the film and the latter for satisfying the winding property and chipping resistance of the film. Usually when two types of inorganic particles differing in particle diameter are contained in the film, this may result in a reduction of electromagnetic transducing performance or increase of dropout because of the influence of the coarse particles present in the region on the large particle diameter side. In the present invention, however, no such problem occurs and it is possible to satisfy the winding property and chipping resistance to a high degree by using the crosslinked polymer particles Y as the large-diameter particles.

The crosslinked polymer particles Y used in the present invention, therefore, need to have a very sharp particle size distribution. When $dY25/dY75$ exceeds 1.5, the electromagnetic transducing performance may lower because of the increase of the coarse particles.

It is also essential that the average particle diameter $dY50$ of the crosslinked polymer particles Y exceeds $dX50$ and is not more than $dX10$ in the particle size distribution of the inorganic particles X. When $dY50 < dX50$, the contribution of the said particles Y to the improvement of winding property and chipping resistance of the film may be unsatisfactory. Preferably, dY50 also exceeds dX40. On the other hand, in order to prevent the deterioration of chipping resistance of the film, it is essential that dY50 does not exceed dX10. This is probably for the reason that when the inorganic particles X of the substantially same diameter as the crosslinked polymer particles exist in small quantities, the force exerted by an object contacted with the film surface is distributed in a favorable way to the projections formed by the crosslinked polymer particles as well as the projections formed by the inorganic particles, thereby preventing the particles from falling off the film.

A typical example of the crosslinked polymer particles usable in the present invention is fine powder of a polymer having a moderate crosslinked structure, for example, a copolymer of (I) a monovinyl compound having only one aliphatic unsaturated bond in the molecule and (II) a compound having two or more aliphatic unsaturated bonds in the molecule as a crosslinking agent. This copolymer may have a group reactable with the polyester.

The compounds (I) usable as a component of the copolymer include acrylic acid, methacrylic acid, their alkyl or glycidyl esters, maleic anhydride and its alkyl derivatives, vinyl glycidyl ether, vinyl acetate, styrene, alkyl-substituted styrene and the like. The compounds (II) include divinylbenzene, divinylsulfone, ethylene glycol dimetharylate and the like. One or more of each of the compounds (I) and (II) are used. The compounds containing ethylene or nitrogen atoms may be copolymerized.

As explained above, the crosslinked polymer particles used in the present invention needs to have a sharp particle size distribution. For this purpose, the particles used are not those obtained by crushing the large-sized particles but preferably the so-called monodisperse spherical crosslinked polymer particles which are produced with a shape close to sphere. The crosslinked polymer particles used in the present invention are also preferably the ones which are subject to a certain degree of deformation when the film is stretched. For obtaining the particles having such conformability to stretching, there can be used the known methods such as adjusting hardness of the particles, their glass transition temperature and their affinity with the polyester in the surface layer. Regarding deformation of the particles, it is preferable that the degree of deformation of the particles in the film after stretched is within the range of 1.1 to 5.0, more preferably 1.2 to 4.0. The particles having such a degree of deformability don't allow easy formation of voids around the individual particles and hardly come off the film even when it is abraded, so that the film is improved in wear resistance.

Further, in the present invention, in order to improve wear and scratch resistance of the film, it is preferable to contain the inorganic particles with a Mohs hardness of not less than 7 in an amount within the range of 0.01 to 1.0% by weight. When producing a laminated film, it is preferable to contain such particles at least in the layer A. The primary particle diameter of these particles is preferably not more than 0.3 $\mu$m, more preferably not more than 0.1 $\mu$m. Examples of inorganic particles having a Mohs hardness of not less than 7 include the particles of alumina, silicon carbide, vanadium carbide, titanium carbide, boron carbide and the like. Of these materials, alumina is preferred because it is easily available industrially and it also contributes greatly to the improvement of scratch resistance. δ-type alumina and γ-type alumina are especially preferred. If necessary two or more types of inorganic particles having a Mohs hardness of not less than 7 may be used.

Such alumina particles can be produced by the known methods, for example, thermal decomposition method in which aluminum chloride anhydride is used as starting material and subjected to flame hydrolysis, or ammonium alum heat decomposition method in which aluminum hydroxide is used as starting material and reacted with sulfuric acid to form aluminum sulfate and the aluminum sulfate is further reacted with ammonium sulfate to produce ammonium alum, which is then calcined. The primary particle diameter of alumina obtained by these methods is usually in the range of 5 to 40 nm, but since there are often formed the agglomerates more than 0.5 $\mu$m in diameter, it is preferable to crush the particles to an appropriate diameter before use. The particles used in the present invention may be the secondary particles formed by agglomeration to a limited degree, but it is preferable that the apparent average diameter of the particles is not more than 0.5 $\mu$m, more preferably not more than 0.2 $\mu$m.

In the present invention, when producing a laminated film, the content of the particles with a Mohs hardness of not less than 7 in the layer B is preferably lower than the content of the said particles in the layer A, and the content of such particles in the whole laminated film is preferably not more than 0.5% by weight, more preferably not more than 0.3% by weight. When the particle content exceeds 0.5% by weight, the degree of damage to the cutting edge in the slitting step in the film forming and magnetic tape working processes may be large, so that it is necessitated to frequently change the cutting edge in the film forming and magnetic tape working processes, resulting in reduced productivity.

In the present invention, it is possible to contain other particles in addition to the said inorganic particles X, crosslinked polymer particles Y and inorganic particles with Mohs hardness of not less than 7, but the content of the other particles should preferably be not in excess of the content of the inorganic particles X. It is indeed essential that the inorganic particles X and the crosslinked polymer particles Y have a specific relation to each other for obtaining the excellent effect of the present invention, but a too much content of other particles may make it impossible to obtain such an effect. As the other particles, it is possible to use those mentioned as the examples of the inorganic particles X, organic particles such as calcium oxalate and calcium terephthalate particles, and so-called precipitated particles which are produced in polymerization of the polyester.

In production of the particle-containing polyester constituting the film of the present invention, the particles may either be added in the course of synthesis reaction of the polyester or may be directly added to the polyester. In case of adding the particles in the course of synthesis reaction, the particles are preferably dispersed in ethylene glycol or such to form a slurry and added in a convenient stage in the synthesis of the polyester. In case where the particles are added directly to the polyester, the method is preferably conducted in which the particles, either in the dried form or in the form of a slurry obtained by dispersing the particles in water or an organic solvent having a boiling point of not more than 200° C., are added to and mixed with the polyester using a double-screw kneader/extruder. If necessary, the particles to be added may be subjected to the pertinent treatments such as crushing, dispersion, classifying and filtration before addition.

For adjusting the content of the particles, the method is convenient in which first a master material containing the particles to a high density is prepared in the manner described above, and this master material is diluted with a material substantially free of the particles to adjust the particle content in the film forming step.

It is preferable for obtaining a high-degree electromagnetic transducing performance that the root mean square roughness (RMS) of the layer A surface of the thus obtained film of the present invention, as measured by a non-contact type surface roughness tester, is 15 to 30 nm, with the P-V value being 200 to 400 nm. When RMS exceeds 30 nm or the P-V value is more than 400 nm, it may not be possible to obtain a high-degree electromagnetic transducing performance, or an increase of dropout may result. On the other hand, when RMS is less than 15 nm, the obtained magnetic tape may be unsatisfactory in running property. Also, when the P-V value is less than 200 nm, there may result deterioration of the winding property or non-uniform winding of the magnetic tape.

The preferred range of RMS is 15 to 25 nm, and the P-v value is preferably 230 to 350 nm.

The layer A may be present either on one side alone or on both sides of the film. Namely, a layer C may be provided on the opposite side of the layer A (ABC layer structure). In the present invention, in order to obtain a film that can highly satisfy the electromagnetic transducing performance and running property of the magnetic recording media at the same time, preferably a layer C made of the same polyester composition as the layer A but differing in thickness is provided on the opposite side of the layer A to form a film whose front and rear side surfaces differ in roughness. Use of the above method for producing a film having different degrees of roughness on the front and rear sides can simplify the production process, which results in good cost performance, and also allows easy adjustment of the film surface properties such as roughness. The thickness of the layer C (tc) is preferably 0.1 to 0.7 times, more preferably 0.2 to 0.5 times the thickness of the layer A (ta). When tc/ta>0.7, there may not be obtained enough difference of surface roughness between the front and rear sides to produce the described effect of the present invention. On the other hand, when tc/ta<0.1, the layer C becomes too small in thickness, resulting in unsatisfactory running property or poor wear resistance of the film. Also, when the layer A becomes too large in thickness, the merit of low production cost may not be attained.

The difference between the root mean square roughness of the layer A surface RMSa and that of the layer C surface RMSc of the thus obtained film is usually in the range of 2 to 15 nm, preferably 2 to 10 nm, more preferably 3 to 8 nm. If the difference in RMS is made more than 15 nm by merely adjusting the difference in layer thickness, the same problems as stated above may arise since the difference in thickness must be enlarged. Also, if the difference in RMS is less than 2 nm, it becomes impossible to highly satisfy the electromagnetic transducing performance, running property and winding property of the film at the same time.

Root mean square roughness of the layer C surface RMSc is preferably 10 to 25 nm, more preferably 13 to 20 nm. When RMSc<10 nm, the obtained film may prove unsatisfactory in running property or winding property in use as a magnetic tape. On the other hand, when RMSc>25 nm, the magnetic layer may be roughened on its surface to deteriorate the electromagnetic transducing performance.

The difference in P-V value between the layer A surface (P-Va) and the layer C surface (P-Vc) is usually in the range of 0 to 100 nm, preferably 5 to 50 nm. When this difference in P-V value is more than 100 nm, the film may be unsatisfactory in wear resistance.

In the film according to the present invention, the percentage of the thickness of the layer B to the overall film thickness is preferably not less than 40%, more preferably not less than 60%. The layer B may or may not contain the fine particles. In case where the layer B comprises a single layer, the content in the layer B of the particles having an average diameter not less than 1.5 times the average diameter dX50 of the inorganic particles X in the layer A is usually not more than 0.05% by weight, preferably not more than 0.01% by weight. Especially preferably, the layer B contains no such particles. When the large particles exist in the layer B, they may create the coarse projections on the layer A surface to deteriorate the electromagnetic transducing performance of the magnetic tape.

The layer B itself may be of a two-layer or more multi-layer laminated structure. Use of a laminated structure for the layer B is credited with the following merits. It is advantageous for material cost reduction to blend an inexpensive material, for example, regenerated film material or regenerated polyester material obtained from molded articles. Such inexpensive polyester material involves the problem that the large particles may be present or there may also exist foreign matter, for example, gelled substance originating in the coating material, which may affect the surface properties of the obtained film. For preventing such a phenomenon, it is effective to laminate a layer made of a material containing no large particles on the outside of the layer made of an inexpensive material. When the layer A is too small in thickness to serve normally as an outside layer, the layer B itself may be designed to have a three-layer structure, with the inner layer thereof being made of a material which may contain the large particles. Since this structure makes it possible to use a wide variety of material for the layer A, significant cost reduction can be realized.

Intrinsic viscosity of the polyester constituting the layer B of the film according to the present invention is usually not more than 0.600, preferably not more than 0.580, more preferably not more than 0.570. When the intrinsic viscosity of the layer B is more than 0.600, the slittability of the film may deteriorate. The lower threshold value of intrinsic viscosity of the layer B is usually 0.450, preferably 0.480, more preferably 0.500, in view of film productivity. When the intrinsic viscosity of the layer B is less than 0.450, film break may occur frequently in the production of the film, resulting in a reduced film productivity, although the situation may differ depending on the intrinsic viscosity of the layer A.

It is also preferable that the intrinsic viscosity of the layer B is at least 0.02 lower than that of the polyester constituting the surface layer, in other words, the intrinsic viscosity of the layer A is preferably at least 0.02, more preferably at least 0.03 higher than the intrinsic viscosity of the layer B. Lowering the intrinsic viscosity of the surface layer leads to deterioration of chipping resistance of the film. Intrinsic viscosity of the layer A is preferably not less than 0.570, more preferably not less than 0.580, even more preferably not less than 0.600.

The film of the present invention shows particularly excellent slittability and high-degree electromagnetic transducing performance and is suited for use as a base film of the magnetic tape especially when the Young's modulus of the film in its width direction is preferably not less than 6.0 GPa, more preferably not less than 6.5 GPa, even more preferably not less than 0.70 GPa, and its tensile elongation at break in the width direction is preferably not more than 100%, more preferably not more than 90%. Deficiency of the slittability of the film leads to such problems as reduced productivity of the film and increased dropout rate of the magnetic tape due to the presence of foreign matter produced during slitting. The lower limit of tensile elongation at break in the width direction is preferably 50%, more preferably 60%, while the upper limit of Young's modulus is usually 10 GPa, preferably 8.0 GPa. Too low tensile elongation at break or too high Young's modulus leads to deterioration of film productivity.

For imparting even better slittability to the film, the ratio of tensile elongation at break in the longitudinal direction to that in the width direction is set to be usually not less than 1.1, preferably not less than 1.2, more preferably not less than 1.3. The upper limit of such a ratio is usually 2.0, preferably 1.8.

Young's modulus in the longitudinal direction is usually not less than 4.0 GPa, preferably not less than 4.3 CPa, more preferably not less than 4.5 GPa. Insufficient Young's modulus in the longitudinal direction may cause elongation of the film in use as a magnetic tape to deteriorate the electromagnetic transducing performance, especially skewness.

In the present invention, co-extrusion method is preferably used for producing the objective laminated film. A laminated film producing process using this co-extrusion method is described below.

First, the polyester materials for forming the respective layers are supplied to an extruding machine for co-extrusion lamination. Using 2 or more sets of extruder and a 3- or more-layer multimanifold or feed block, the polyester materials are laminated and extruded into a 3- or more-layer molten sheet from a slit die. The thickness of each layer can be set by controlling the polymer flow rate by a measuring feeder comprising a gear pump, etc., installed on the melt line. Then, the molten sheet extruded from the die is rapidly cooled to a temperature below the glass transition temperature thereof and solidified on a rotary cooling drum to obtain a substantially amorphous non-oriented sheet. In this case, in order to enhance flatness of the sheet, it is necessary to enhance adhesion between the sheet and the cooling drum. In the present invention, to this end, electrostatic pinning method and/or liquid coating adhesion method is preferably used.

In the present invention, the thus obtained sheet is stretched biaxially to make a film.

The stretching operation conducted in the present invention is explained more particularly below. The said non-stretched sheet is first stretched 3.0 to 7 times, preferably 3.2 to 6 times in one direction by a roll or tenter type stretcher at a temperature of preferably 70 to 150° C., more preferably 75 to 130° C. Then the sheet is further stretched 3.2 to 7 times, preferably 3.5 to 6 times in the direction orthogonal to the initial stretching direction at preferably 75 to 150° C., more preferably 80 to 140° C., to obtain a biaxially oriented film. Stretching in one direction may be conducted in two or more stages, but in this case, too, such stretching is preferably performed so that the final stretch ratio will fall in the above-defined range. The said non-stretched sheet may be stretched in two axial directions simultaneously to effect 10 to 40 times enlargement in surface area.

The thus obtained film is then heat treated at 150 to 250° C. for one second to 5 minutes under elongation of up to 30%, limited shrinkage or fixed length. After biaxial stretching, the film may be re-stretched 1.05 to 2.5 times in the machine direction at 110 to 180° C. and then heat treated. In this case, such techniques as heat fixing before longitudinal re-stretching, longitudinal relaxing after longitudinal re-stretching, and small-ratio longitudinal stretching before or after longitudinal re-stretching, may be properly used.

Similar re-stretching may be conducted in the transverse direction. Also, if necessary, various types of surface treatment may be conducted in the film forming step.

In the film of the present invention, especially when the film is used for a magnetic recording medium, a coating may be provided on the film surface for enhancing adhesion to the magnetic layer. Such a coating may be provided in the film manufacturing process or after manufacture of the film. In view of uniformity of the coating thickness and production efficiency, it is preferable to apply the coating at a stage after stretching in the machine direction and before stretching in the transverse direction in the film manufacturing process.

Examples of the coating materials usable here include, but are not limited to, the resins such as polyesters, polyamides, polystyrenes, polyacrylates, polycarbonates, polyarylates, polyvinyl chloride, polyvinylidene chloride, polyvinyl butyral, polyvinyl alcohol and polyurethane, which show excellent adhesiveness to the magnetic layer, and copolymers and mixtures of these resins. Of these materials, polyester resins are especially preferred. It is also preferable to blend a crosslinking agent in the coating for preventing deterioration of handling qualities due to blocking of the film. The crosslinking agents usable in the present invention include epoxy type, melamine type, isocyanate type, aziridine type and oxazoline type.

The coating material used in the present invention is preferably of the type using water as medium. Such a coating material may be the one which has been forcibly dispersed by a surfactant or such, but it is preferably a self-dispersing type coating material having a hydrophilic nonionic component such as a polyether and a cationic group such as quaternary ammonium salt, or a water-soluble or water-dispersed resin coating material having an anionic group.

In case where the film of the present invention is used as base film of a magnetic recording medium for video pancake used for a high-speed dubbing device, it is effective for elevating quality to apply such an adhesive treatment for preventing exfoliation of the magnetic layer.

In the present invention, it is possible to contain other polymers (such as polyethylene, polystyrene, polycarbonate, polysulfone, polyphenylene sulfide, polyamide, polyimide, etc.) in an amount not exceeding 10% by weight based on the total amount of polyesters used for the film. It is also possible to blend additives such as antioxidant, heat stabilizer, lubricant, dye, pigment, etc., as required.

The film according to the present invention, when used as a base film for magnetic recording media, can highly satisfy the quality requirements for winding, running and electromagnetic transducing as a magnetic recording medium. It also shows excellent slittability in manufacture of films and magnetic recording media, and is protective against occurrence of dropout, resistant to scratching and generation of abrasion dust, high in productivity and low in manufacturing cost. Thus, the present invention is of very high industrial value.

EXAMPLES

The present invention is further illustrated by showing the examples thereof, but it should be understood that these examples are merely intended to be illustrative and not to be construed as limiting the scope of the invention. The determination methods and definitions of the various properties shown in the Examples are explained below. In the following Examples and Comparative Examples, all "parts" are by weight unless otherwise noted.

(1) Average particle diameter (size) and particle size distribution factor:

In the case of the particles whose diameter and shape were uniform, like the spherical crosslinked polymer particles, the average particle diameter was determined by electron micrography. The diameters of approximately 1,000 particles were measured, and the volume was integrated from the large particle side. The particle diameter at the point of 25% of the total volume was designated d25, the diameter at the point of 50% was designated d50, and the diameter at the point of 75% was designated d75. d50 was shown as average particle diameter, and the ratio of d25 to d75 (d25/d75) was shown as particle size distribution factor.

Regarding the other particles, the particle diameter at the integrated volume fraction of 50% in the equivalent sphericity distribution determined by a centrifugal precipitation type particle size distribution meter SA-CP3 (mfd. by Shimadzu Corp.) was expressed as average particle diameter d50. Also, the particle diameter at the point of weight fraction of n% in integration from the large particle side was designated dn (expressed, for instance, like "d40" or "d10").

(2) Intrinsic viscosity $[,\eta]$ of polymer (dl/g):

1 g of polymer was dissolved in 100 ml of a 50/50 (by weight) mixture of phenol and tetrachloroethane, and viscosity of the solution was measured at 30° C.

(3) Layer thickness of the film:

The film layer thickness was determined by observing a cut section of the film by a transmission electron microscope (TEM). A small piece of sample film was embedded in a resin prepared by blending a curing agent and an accelerator in an epoxy resin, and cut into an approximately 200 nm piece by an ultra-microtome to make a sample for observation. A cut section of the obtained sample was micrographed using a transmission electron microscope H-90 (mfd. by Hitachi Ltd.), and the thickness of the surface layer was determined.

Acceleration voltage was 300 kV and the magnification was set within the range of X10,000 to X100,000 according to the outermost surface layer thickness. Measurement was made at 50 points in all. The measurements at 10 points from the largest measurement of thickness and the measurements at 10 points from the smallest measurement of thickness were discounted, and the average of the measurements at the remaining 30 points was shown as the determined value (of the layer thickness).

(4) Root mean square roughness (RMS) and P-V value:

RMS and P-V value were determined using a 2-flux interference type (object lens: N20 magnification) non-contact surface shape measuring system MICROMAP 512 (mfd. by Micromap Inc.). Measurement was made at 50 fields of vision, and the average of 50 measurements was shown.

(5) Young's modulus (GPa) of the film:

Using a tensile tester INTESCO MODEL 2001 (mfd. by Intesco Ltd.) and in a room adjusted to 23° C. and 50% RH, each sample film having a length (distance between chucks) of 300 mm and a width of 20 mm was pulled at a straining rate of 10%/min, and using the initial straight line section of the tensile stress/strain curve, Young's modulus was calculated from the following equation:

$$E = \Delta\sigma/\Delta\epsilon$$

(E: Yount's modulus (GPa); $\Delta\sigma$: difference of stress (GPa) according to the original average sectional area between the two points on the straight line; $\Delta\epsilon$: difference of strain between the said two points/initial length (–))

(6) Tensile elongation at break (%)

Using a tensile tester INTESCO MODEL 2001 (mfd. by Intesco Ltd) and in a room adjusted to 23° C. and 50% RH, each sample film measuring 50 mm in length (between chucks) and 15 mm in width was pulled at a straining rate of 200 mm/min, and referring to the tensile stress/strain curve, tensile elongation at break was determined from the following equation:

$$LB = \frac{(L - L_0)}{L_0} \times 100$$

(LB: tensile elongation at break; L: film length (mm) at break; $L_0$: original film length (mm))

(7) Abrasion resistance:

A 10 mm wide polyester film was let run in contact with a fixed pin (made of SUS420-J2, finished to 0.2S; diameter: 6 mm) along a distance of 200 meters, and the amount of abrasion dust deposited on the fixed pin was visually observed and rated according to the following 4-rank system. The film was passed round the fixed pin at an angle of 125° and run at a speed of 11.4 m/min under an initial tension of 300 g.

A: No deposition of abrasion dust was seen.

B: A slight degree of deposition of abrasion dust was seen, but it posed no problem for practical use.

C: A considerable degree of deposition of abrasion dust was observed, and it presented problems for long time use.

D: Heavy deposition of abrasion dust occurred, making the film practically unusable.

(8) Slittability :

The film was slit along a length of 1,000 meters by a slitter, and the cutting edges of the slitter were examined microscopically. Slittability was evaluated according to the degree of damage to the cutting edges as shown below.

A: Almost no damage was seen.

B: Slight damage was noted, but it presented no problem for practical use.

C: A considerable degree of damage took place, and it presented problems for long-time use.

D: Damage was great and the film was unfit for practical use.

When film slittability is bad, the cutting edges of the slitter must be changed frequently in the film producing process. Slittability is also evaluated by dropout count in the magnetic tape properties. Poor slittability may increase dropout count.

(9) Magnetic tape properties:

200 parts of magnetic powder, 30 parts of polyurethane resin, 10 parts of nitrocellulose, 10 parts of a vinyl chloride-cellulose acetate copolymer, 5 parts of lecithin, 100 parts of cylcohexanone, 100 parts of methyl isobutyl ketone and 300 parts of methyl ethyl ketone were mixed and dispersed by a ball mill for 48 hours, and then 5 parts of a polyisocyanate compound was added to prepare a magnetic coating composition. This coating composition was applied on the layer C surface (the layer A surface in the case of the A/B/A laminate or when the film is made of a single layer A) of a polyester film, and the coating was magnetically oriented before sufficiently dried and solidified, and then dried to form a 2 $\mu$m thick magnetic layer.

The coated film was then calendered by a supercalender composed of the planished metal rolls and the polyester-based composite resin rolls. The thus obtained tape was slit to a ½ inch wide piece and put to practical use in a NV-3700 video deck (mfd. by Matsushita Electric Co., Ltd.) at normal speed to evaluate the following magnetic tape properties:

(A) Electromagnetic property (Electromagnetic transducing performance (VTR head output)):

The initial VTR head output at a measuring frequency of 4 MHz was measured by a synchroscope and compared with that of a standard tape (a commercial high-grade type video tape), and the tape was rated according to the following 3-rank criterion.

A: Equal to the standard tape.

B: Slightly inferior to the standard tape.

C: Obviously inferior to the standard tape and unable to stand practical use.

(B) Dropout:

The video tapes which recorded the signals of 4.4 MHz were played back and the occurrence of dropout was counted for about 20 minutes by a dropout counter mfd. by Ohkura Industry Co., Ltd. The tapes which showed a good result were rated A, those which were defective and could not stand practical use were rated C, and those ranked intermediate between A and C were rated B.

(10) Scratch resistance:

A magnetic tape slit to a 1/2 inch width was passed round a 6 mm-diameter hard chrome-plated metal pin (finished to 3S) at a winding angle of 135° and let run at a speed of 4 m/min under a tension of 50 g for one trip with the base film side of the tape being pressed frictionally against the pin.

Then aluminum was vacuum deposited to a thickness of about 50 nm on the side of the tape which was contacted frictionally with the pin, and the amount of damage to the tape was visually observed, rating the tape according to the following ranking.

Rank 1: The amount of damage is very large.

Rank 2: The amount of damage is large.

Rank 3: The amount of damage is intermediate between Rank 2 and Rank 4.

Rank 4: The amount of damage is small.

Rank 5: No damage at all.

(11) Running property:

A video tape was set in a commercial VHS system VTR and let run for 180 minutes with the back tension on the delivery side being zeroed. The running condition of the video tape was observed with a pin located immediately in front of the head cylinder, and evaluated according to the following criterion.

A: Deviation of the path of the running tape from the prescribed position is less than 0.5 mm.

B: Deviation of the path of the running tape from the prescribed position is 0.5 to 2 mm.

C: Deviation of the path of the running tape from the prescribed position is not less than 2 mm.

Examples 1 to 6 and Comparative Examples 1 to 5
<Production of crosslinked polymer particles>

2 parts of potassium persulfate, which is a water-soluble polymerization initiator, and 0.7 part of lauryl sodium (trade name: Emal 0, produced by Kao Corp.), which is an anionic surfactant, used as a dispersion stabilizer, were added to 600 parts of desalted water and dissolved homogeneously. Then a mixed solution of 30 parts of ethylene glycol monomethacrylate, 20 parts of n-butyl acrylate, 20 parts of styrene and 30 parts of divinylbenzene was added gradually with stirring under a nitrogen gas atmosphere to carry out polymerization reaction at 70° C. for 12 hours.

The reaction rate was 98%, the average diameter of the obtained particles was 0.75 µm, and the particle size distribution factor was 1.04. The obtained particles were almost spherical.

The water slurry of the obtained particles was cooled to 50° C., to which one part of the partial ammonium neutralized product of a sodium polyacrylate/methoxypolyethylene glycol/polypropylene glycol monomethacrylate/methoxypolyethylene glycol monomethacrylate copolymer was added. After stirring for one hour, 2,000 parts of ethylene glycol was added and water was evaporated away by heating under reduced pressure.

<Production of polyester>

100 parts of dimethyl terephthalate, 60 parts of ethylene glycol and 0.09 part of magnesium acetate tetrahydrate were heated in a reactor to carry out an ester exchange reaction while evaporating away methanol. The temperature was raised to 230° C. taking four hours from start of the reaction, at which point: the ester exchange reaction was terminated substantially.

Then the ethylene glycol slurry of the previously obtained crosslinked polymer particles was added. Thereafter, 0.03 part of phosphoric acid and 0.04 part of antimony trioxide were added and the reaction system was gradually reduced in pressure while raising the temperature to carry out polycondensation reaction for 4 hours to obtain a polyester having an intrinsic viscosity of 0.64. The content of the crosslinked polymer particles was 0.5% by weight.

The same procedures of ester exchange reaction and polymerization reaction as described above were conducted except that an ethylene glycol slurry of the synthetic calcium carbonate particles having an average diameter of 0.41 µm and a particle size distribution factor of 1.55, instead of the said crosslinked polymer particles, was added so that the particle density relative to the polyester would become 1.0% by weight, to obtain a polyester having an intrinsic viscosity of 0.63.

Further, an ethylene glycol slurry of the previously crushed, classified and filtered δ-alumina particles having a primary particle diameter was added so that the particle density would become 1.5% by weight to obtain a polyester having an intrinsic viscosity of 0.63. Also, the above-described procedures of ester exchange reaction and polycondensation reaction were conducted except that the said crosslinked polymer particles were not added to obtain a polyester having an intrinsic viscosity of 0.64 which is substantially free of inactive particles and a polyester having an intrinsic viscosity of 0.59. Further, the same procedures of ester exchange reaction and polycondensation reaction as described above were conducted except for the addition of an ethylene glycol slurry of the synthetic calcium carbonate particles (added in an amount of 1.0% by weight based on the polyester), the crosslinked polymer particles (0.6% by weight based on the polyester) or the spherical silica particles (1.0% by weight based on the polyester) having the average particle diameter and particle size distribution factor shown in Table 1 to obtain the various types of polyester material having an intrinsic viscosity of 0.63. Microscopical observation of the inside of the polyesters containing the particles confirmed that the particles were dispersed uniformly.

In case where the said particle content might become deficient, a high-density master batch having the particles added at the time of melt extrusion of the polyester was made and used.

Mohs hardness of the synthetic calcium carbonate was 3, that of the spherical silica particles was 6 and that of the δ-alumina particles was 9.

<Manufacture of polyester film>

The obtained polyester materials were blended to have the particle contents (wt %) shown in Table 1 to prepare the polyester materials for the layer A and the layer C. As the material containing no particles, there was used a polyester having an intrinsic viscosity of 0.64.

As the material for the layer B, a blend of 8 parts of a material of the same composition as the layer A material and 92 parts of a polyester having an intrinsic viscosity of 0.59 was used. The material for the layer A and the material for the layer B were severally dried and melt extruded by the separate melt extruders in the known way to obtain the 2-material, 3-layer laminated (A/B/A or A/B/C) amorphous sheets. In Example 3, melt extrusion was conducted using a single extruder to obtain a monolayer amorphous sheet.

This amorphous sheet was stretched 3.0 times in the machine direction (longitudinal direction) at 87° C., then 1.15 times in the same direction at 76° C. and further stretched 4.6 times in the transverse direction at 110° C., then heat treated at 214° C. for 4 seconds and relaxed 2.0% in the transverse direction at 200° C. to obtain a biaxially oriented laminated film. The overall thickness of the film was 15.0 μm and the thicknesses of the respective laminations were as shown in Table 1. In Example 1, intrinsic viscosity of the layer A of the obtained film was 0.618 and that of the layer B was 0.567.

Example 7

The same procedure as defined in Example 1 was conducted except that the stretch ratio in the machine direction was enlarged while the stretch ratio in the transverse direction was reduced to make a film.

A magnetic layer was coated on each of the films obtained in the Examples and Comparative Examples to make the magnetic tapes and their properties were evaluated. The film properties and the results of evaluation of the magnetic tapes are shown in Tables 1 to 3.

TABLE 1

| | Particles in layer A and layer C | | | | | Layer structure and thickness (μm) |
|---|---|---|---|---|---|---|
| | Type of particles | d50 | d25/d75 | d10 | d40 | Content | |

| | Type of particles | d50 | d25/d75 | d10 | d40 | Content | thickness (μm) |
|---|---|---|---|---|---|---|---|
| Ex. 1 | Synthetic calcium carbonate | 0.59 | 1.63 | 0.90 | 0.65 | 0.50 | A/B/C 1.5/12.8/0.7 |
| | Cross-linked polymer | 0.80 | 1.05 | — | — | 0.10 | |
| | δ-type alumina | 0.06 | — | — | — | 0.30 | |
| Ex. 2 | Synthetic calcium carbonate | 0.51 | 1.61 | 0.80 | 0.56 | 0.52 | A/B/A 1.5/12.0/1.5 |
| | Cross-linked polymer | 0.70 | 1.04 | — | — | 0.15 | |
| | δ-type alumina | 0.06 | — | — | — | 0.35 | |
| Ex. 3 | Synthetic calcium carbonate | 0.59 | 1.63 | 0.90 | 0.65 | 0.35 | Monolayer film Thickness: 15 μm |
| | Cross-linked polymer | 0.80 | 1.05 | — | — | 0.10 | |
| | δ-type alumina | 0.06 | — | — | — | 0.30 | |
| Ex. 4 | Synthetic calcium carbonate | 0.59 | 1.63 | 0.90 | 0.65 | 0.55 | A/B/C 1.5/12.8/0.7 |
| | Cross-linked polymer | 0.80 | 1.05 | — | — | 0.10 | |
| Ex. 5 | Silica | 0.65 | 1.90 | 1.20 | 0.78 | 0.50 | A/B/C 1.5/12.8/0.7 |
| | Cross-linked polymer | 0.80 | 1.05 | — | — | 0.10 | |
| | δ-type alumina | 0.06 | — | — | — | 0.30 | |
| Ex. 6 | Synthetic calcium carbonate | 0.59 | 1.63 | — | — | 0.55 | A/B/C 1.5/12.8/0.7 |
| | Cross-linked polymer | 0.80 | 1.25 | — | — | 0.15 | |
| | δ-type alumina | 0.06 | — | — | — | 0.35 | |
| Comp. Ex. 1 | Synthetic calcium carbonate | 0.59 | 1.63 | 0.90 | 0.65 | 0.50 | A/B/C 1.5/12.8/0.7 |
| | Cross-linked polymer | 1.20 | 1.10 | — | — | 0.10 | |
| | δ-type alumina | 0.06 | — | — | — | 0.30 | |
| Comp. Ex. 2 | Synthetic calcium carbonate | 0.59 | 1.63 | 0.90 | 0.65 | 0.40 | A/B/C 1.5/12.0/1.5 |
| | Cross-linked polymer | 0.50 | 1.05 | — | — | 0.25 | |
| | δ-type alumina | 0.06 | — | — | — | 0.35 | |
| Comp. Ex. 3 | Synthetic calcium carbonate | 0.59 | 1.63 | 0.90 | 0.65 | 0.45 | A/B/C 1.5/12.8/0.7 |
| | Spherical silica | 0.80 | 1.03 | — | — | 0.10 | |
| | δ-type alumina | 0.06 | — | — | — | 0.30 | |
| Comp. Ex. 4 | Synthetic calcium carbonate | 1.70 | 2.15 | 2.0 | 3.5 | 0.25 | A/B/C 1.5/12.0/1.5 |
| | Cross-linked polymer | 2.10 | 1.95 | — | — | 0.05 | |
| Comp. Ex. 5 | Synthetic calcium carbonate | 0.62 | 1.65 | 0.95 | 0.69 | 0.45 | A/B/C 1.5/12.8/0.7 |
| | Cross-linked polymer | 0.80 | 1.60 | — | — | 0.15 | |
| | δ-type alumina | 0.06 | — | — | — | 0.30 | |

TABLE 2

| | Example 1 | Example 2 | Example 3 | Example 4 |
|---|---|---|---|---|
| Noncontact surface roughness (nm) | | | | |
| RMS | | | | |
| Layer A side | 23 | 22 | 25 | 23 |
| Layer C side | 19 | 22 | 25 | 20 |

TABLE 2-continued

| | Example 1 | Example 2 | Example 3 | Example 4 |
|---|---|---|---|---|
| P-V | | | | |
| Layer A side | 350 | 320 | 360 | 350 |
| Layer C side | 280 | 320 | 350 | 270 |
| Young's modulus (GPa) | | | | |
| Longitudinal direction | 4.6 | 4.7 | 4.5 | 4.5 |
| Transverse direction | 7.2 | 7.3 | 7.0 | 7.1 |
| Tensile elongation at break (%) | | | | |
| Longitudinal direction | 160 | 165 | 145 | 160 |
| Transverse direction | 60 | 93 | 88 | 87 |

| | Example 5 | Example 6 | Example 7 | Comp. Example 1 |
|---|---|---|---|---|
| Noncontact surface roughness (nm) | | | | |
| RMS | | | | |
| Layer A side | 26 | 24 | 22 | 28 |
| Layer C side | 25 | 20 | 19 | 24 |
| P-V | | | | |
| Layer A side | 450 | 430 | 340 | 460 |
| Layer C side | 360 | 340 | 270 | 420 |
| Young's modulus (GPa) | | | | |
| Longitudinal direction | 4.4 | 4.6 | 4.9 | 4.5 |
| Transverse direction | 6.9 | 7.1 | 6.4 | 7.0 |
| Tensile elongation at break (%) | | | | |
| Longitudinal direction | 140 | 155 | 120 | 150 |
| Transverse direction | 95 | 90 | 110 | 80 |

| | Comp. Example 2 | Comp. Example 3 | Comp. Example 4 | Comp. Example 5 |
|---|---|---|---|---|
| Noncontact surface roughness (nm) | | | | |
| RMS | | | | |
| Layer A side | 19 | 22 | 37 | 30 |
| Layer C side | 16 | 20 | 37 | 30 |
| P-V | | | | |
| Layer A side | 240 | 320 | 570 | 410 |
| Layer C side | 210 | 310 | 560 | 370 |
| Young's modulus (GPa) | | | | |
| Longitudinal direction | 4.7 | 4.9 | 4.2 | 4.4 |
| Transverse direction | 7.2 | 7.0 | 6.8 | 7.0 |
| Tensile elongation at break (%) | | | | |
| Longitudinal direction | 160 | 120 | 120 | 122 |
| Transverse direction | 85 | 83 | 81 | 85 |

TABLE 3

| | Example 1 | Example 2 | Example 3 | Example 4 |
|---|---|---|---|---|
| Magnetic recording properties | | | | |
| Electro-magnetic transducing performance | A | B | B | A |
| Dropout | A | A | A | A |
| Abrasion resistance | A | A | A | B |
| Slittability | A | A | B | A |
| Scratch resistance | 5 | 5 | 5 | 3 |
| Running property | A | A | A | A |

| | Example 5 | Example 6 | Example 7 | Comp. Example 1 |
|---|---|---|---|---|
| Magnetic recording properties | | | | |
| Electro-magnetic transducing performance | B | B | B | B |
| Dropout | B | A | B | B |
| Abrasion resistance | B | B | A | C |
| Slittability | A | A | B | A |
| Scratch resistance | 5 | 5 | 5 | 4 |
| Running property | A | A | A | A |

| | Comp. Example 2 | Comp. Example 3 | Comp. Example 4 | Comp. Example 5 |
|---|---|---|---|---|
| Magnetic recording properties | | | | |
| Electro-magnetic transducing performance | A | B | C | B |
| Dropout | B | B | C | B |
| Abrasion resistance | C | D | C | B |
| Slittability | B | B | B | B |
| Scratch resistance | 5 | 4 | 5 | 4 |
| Running property | B | A | A | A |

What is claimed is:

1. A biaxially oriented polyester film containing 0.01 to 3.0% by weight of inorganic particles X and 0.001 to 1.5% by weight of crosslinked polymer particles Y, the particles diameters of said particles X and Y satisfying the following relationships (1) to (3) at the same time:

$$0.1 \leq dX50 \leq 1.5 \quad (1)$$

$$dX50 < dY50 \leq dX10 \quad (2)$$

$$1.0 \, dY25/dY75 \leq 1.5 \quad (3)$$

wherein dX50 represents the average diameter ($\mu$m) of the inorganic particles X; dX10 represents the particle diameter at the point of 10% of the total volume when the volume has been integrated from the large particle diameter in the particle size distribution of the inorganic particles X; dY50 represents the average diameter ($\mu$m) of the crosslinked polymer particles Y; and dY25 and dY75 represent the particle diameters ($\mu$m) at the points of 25% and 75%, respectively, of the total volume when the volume has been integrated from the large particle side in the particle size distribution of the crosslinked polymer particles Y.

2. A biaxially oriented polyester film according to claim 1, wherein the content of the inorganic particles X is 0.01 to 1.0% by weight, and the content of the crosslinked polymer particles is 0.001 to 1.0% by weight.

3. A biaxially oriented polyester film according to claim 1, wherein the inorganic particles X are calcium carbonate.

4. A biaxially oriented polyester film according to claim 1, which further comprises a layer B comprising a polyester, laminated on the layer A of the polyester film defined in claim 1.

5. A biaxially oriented polyester film according to claim 4, wherein two layers A are laminated on both surfaces of the layer B.

6. A biaxially oriented polyester film according to claim 4, wherein the content of the crosslinked polymer particles Y in the layer A is 0.01 to 1.5% by weight.

7. A biaxially oriented polyester film according to claim 4, wherein the thickness of the layer A is 0.1 to 5.0 μm.

8. A biaxially oriented polyester film according to claim 4, wherein layer A further contains fine particles having a Mohs hardness of not less than 7 and an average primary particle diameter of not more than 0.3 μm in an amount within the range of 0.01 to 1.0% by weight.

9. A biaxially oriented polyester film according to claim 4, wherein the root mean square roughness of the layer A surface as measured by a noncontact type surface roughness tester is 5 to 30 nm, and the P-V value is 100 to 500 nm.

10. A biaxially oriented polyester film according to claim 4, which further comprises a layer C comprising the same polyester composition as the layer A, laminated on the opposite side of the layer B, wherein the layer C thickness tc is 0.1 to 0.7 times the layer A thickness, and the difference in root mean square roughness between the layer A surface and the layer C surface, as determined by a noncontact type surface roughness tester, is within the range of 2 to 15 nm.

* * * * *